US011190748B1

(12) United States Patent
LeVake et al.

(10) Patent No.: US 11,190,748 B1
(45) Date of Patent: Nov. 30, 2021

(54) DYNAMIC PARALLAX CORRECTION FOR VISUAL SENSOR FUSION

(71) Applicant: Rockwell Collins, Inc., Cedar Rapids, IA (US)

(72) Inventors: Andrew J. LeVake, Cedar Rapids, IA (US); Peter R. Bellows, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/953,757

(22) Filed: Nov. 20, 2020

(51) Int. Cl.
| *H04N 13/128* | (2018.01) |
| *H04N 13/111* | (2018.01) |
| *H04N 13/366* | (2018.01) |
| *H04N 5/232*  | (2006.01) |
| *H04N 13/239* | (2018.01) |
| *H04N 13/332* | (2018.01) |

(52) U.S. Cl.
CPC ..... *H04N 13/128* (2018.05); *H04N 5/232121* (2018.08); *H04N 13/111* (2018.05); *H04N 13/239* (2018.05); *H04N 13/366* (2018.05); *H04N 13/332* (2018.05); *H04N 2213/002* (2013.01)

(58) Field of Classification Search
CPC .. H04N 13/128; H04N 13/111; H04N 13/239; H04N 5/232121; H04N 13/366; H04N 2213/002; H04N 13/332
USPC .......................................................... 348/47
See application file for complete search history.

(56) References Cited

U.S. PATENT DOCUMENTS

| 3,621,326 | A | 11/1971 | Hobrough |
| 3,646,336 | A | 2/1972 | Hobrough |
| 4,978,983 | A | 12/1990 | Stålfors |
| 5,963,664 | A | 10/1999 | Kumar et al. |
| 7,652,251 | B1 | 1/2010 | King |
| 7,924,312 | B2 | 4/2011 | Packard |
| 8,466,422 | B2 | 6/2013 | Johnson et al. |
| 9,936,131 | B2 | 4/2018 | Putraya et al. |
| 2011/0122131 | A1* | 5/2011 | Bruls ................... H04N 19/597 345/419 |
| 2013/0300875 | A1* | 11/2013 | Strandemar ............ H04N 5/217 348/164 |

(Continued)

FOREIGN PATENT DOCUMENTS

| CN | 106780303 A | 5/2017 |
| CN | 108734657 A | 11/2018 |
| KR | 1020100068751 A | 6/2010 |

*Primary Examiner* — Tung T Vo
(74) *Attorney, Agent, or Firm* — Suiter Swantz pc llo (57) ABSTRACT

An augmented reality (AR) vision system is disclosed. A display is configured to present a surrounding environment to eyes of a user of the AR vision system. A depth tracker is configured to produce a measurement of a focal depth of a focus point in the surrounding environment. Two or more image sensors receive illumination from the focus point and generate a respective image. A controller receives the measurement of the focal depth, generates an interpolated look-up-table (LUT) function by interpolating between two or more precalculated LUTs, applies the interpolated LUT function to the images to correct a parallax error and a distortion error at the measured focal depth, generates a single image of the surrounding environment, and displays the single image to the user.

15 Claims, 6 Drawing Sheets

(56) References Cited

U.S. PATENT DOCUMENTS

| | | | |
|---|---|---|---|
| 2016/0205341 A1* | 7/2016 | Hollander | H04N 7/015 375/240.08 |
| 2017/0365102 A1* | 12/2017 | Huston | G02B 27/017 |
| 2018/0063516 A1* | 3/2018 | Keesling | H04N 13/239 |
| 2018/0131921 A1* | 5/2018 | Haruyama | H04N 13/106 |
| 2019/0058811 A1* | 2/2019 | Douady-Pleven | G06T 3/0093 |
| 2020/0193560 A1 | 6/2020 | Fleming-Mwanyoha | |
| 2020/0302682 A1* | 9/2020 | Aksoy | G06T 19/006 |
| 2020/0368625 A1* | 11/2020 | Iwata | G06F 3/0484 |
| 2020/0394830 A1* | 12/2020 | Choubey | G06F 3/013 |

* cited by examiner

DYNAMIC PARALLAX CORRECTION FOR VISUAL SENSOR FUSION

SUMMARY

An augmented reality (AR) vision system is disclosed in accordance with one or more illustrative embodiments of the present disclosure. In one illustrative embodiment, the AR system comprises a display configured to present a surrounding environment to eyes of a user of the AR vision system. In another illustrative embodiment, the AR system comprises a depth tracker configured to produce a measurement of a focal depth of a focus point in the surrounding environment, wherein the eyes of the user are focused on the focus point. In another illustrative embodiment, the AR system comprises two or more image sensors. Each respective one of the image sensors is configured to receive illumination from the focus point and generate a respective image of a plurality of images. At least one of the image sensors is not optically aligned with at least one other of the two or more image sensors. At least one of the images has a parallax error with at least one other of the images. Each of the images has a distortion error caused by lenses. In another illustrative embodiment, the AR system comprises a controller communicatively couplable to the two or more image sensors including one or more processors configured to execute program instructions. The program instructions cause the one or more processors to: receive the measurement of the focal depth from the depth tracker and generate an interpolated look-up-table (LUT) function by interpolating between two or more precalculated LUTs. Each respective one of the two or more precalculated LUTs is configured to correct the parallax error and the distortion error at a respective depth that is different from the focal depth of the focus point. The program instructions further cause the one or more processors to: apply the interpolated LUT function to the images to correct the parallax error and the distortion error at the measured focal depth and generate a single image of the surrounding environment, and display the single image on the display to the user of the AR vision system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Computer vision systems (CVSs) display a scene of user's surroundings to the user (for example, a pilot of an aircraft) using a head-mounted display (HMD), goggles, glasses, a monitor screen, etc. CVSs have applications in military training and operations, transportation, gaming, manufacturing, among other applications. CVSs are also known as enhanced flight vision system (EFVSs), synthetic vision systems (SVSs), and/or augmented reality (AR) systems.

The scene may be captured using one or more sensors coupled to a CVS. The CVS may modify the image to include additional information (e.g., flight data, target identification data, etc.) and display the modified image to the user. Before the CVS modifies the image and displays it, the image may be corrected for optical aberrations and other physical problems related to the sensors, lenses and other components of the optical system.

One problem relates to distortion in the captured images caused by spherical lenses in front of the sensors. Distorted images deviate from rectilinear projection (i.e., where straight lines in the scene remain straight in the image). Curves appear in the distorted images where they should otherwise be straight. The distortions make navigation and accurate identification of targets difficult or even impossible.

Another problem relates to double vision in the image caused by multiple sensors. When using multiple sensors (e.g., multispectral fusion systems including an optical camera and an infrared camera) at multiple eyepoints (e.g., that do not share the same field of view and are not boresighted to each other), the images captured by each camera are fused (i.e., processed) to generate a single image that appears to show depth perception (e.g., using a stereo vision algorithm). This process is also known as image registration, and is similar to the natural process of stereopsis found in humans and other organisms that enables binocular vision.

Figure 1:
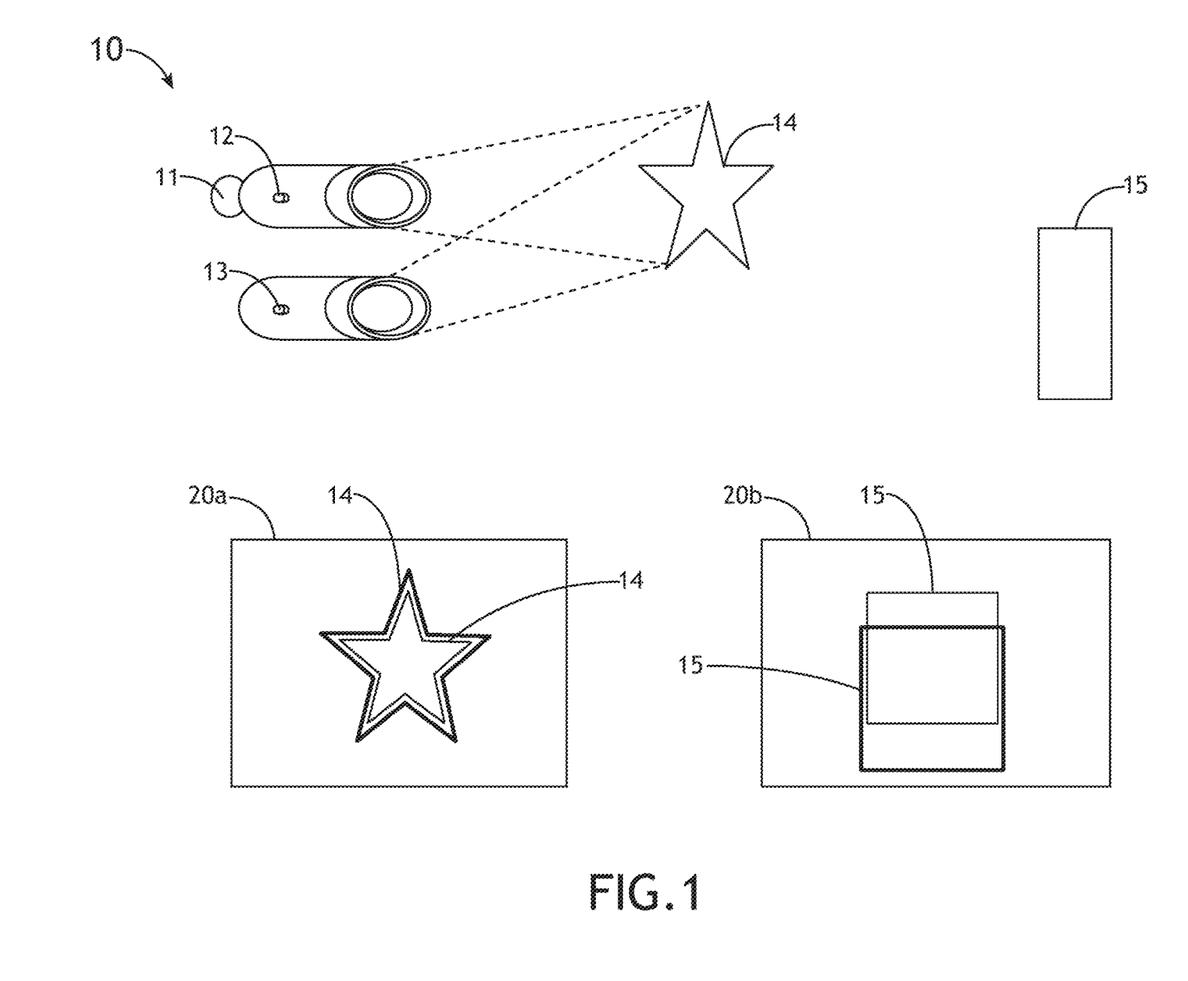
FIG. 1 is a diagram illustrating image misregistration in a conventional system.

FIG. 1 is a diagram illustrating image misregistration in a conventional imaging system 10. The conventional system includes sensors 12 and 13 configured to image objects 14 and 15. The sensor 12 is boresighted at eyepoint 11 and the sensor 13 acts as a supplemental sensor that is not boresighted to the same point as the sensor 12.

The object 14 is at a first depth (e.g., at a first distance from the sensors 12 and 13), and the object 15 is at a second depth (e.g., at a second distance from the sensors 12 and 13). The second distance is longer than the first distance such that the object 15 is farther away from the sensors 12 and 13 than the object 14. The conventional system 10 registers the images captured by each sensor 12 and 13 by combining them into a single image (i.e., aligns their perspectives to correct parallax). However, this registration is only effective when viewing objects at a single fixed focal depth (in this case, the object 14 at the first depth). The combined image 20a shows a correct alignment (i.e., corrected for parallax) between the images captured by the sensors 12 and 13 at the first focal depth.

In contrast, the combined image 20b shows an incorrect alignment between the images captured by the sensors 12 and 13 due to the ineffectiveness of the conventional algorithm at registering multiple sensor images at multiple focal depths. Although FIG. 1 shows a binocular system (i.e., two sensors, where one is boresighted and the other isn't boresighted to match the same point of focus), this problem also manifests in systems with more than two sensors (e.g., four, eight, etc., where some sensors are boresighted to the same point and other sensors are not boresighted to the same point).

Figure 2A:
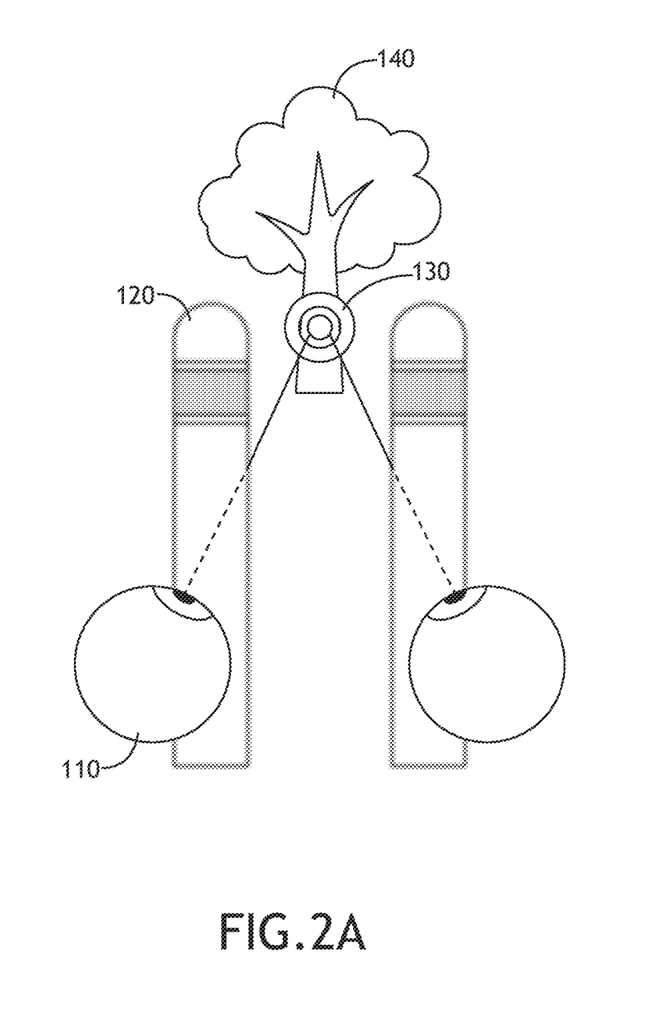
FIGS. 2A-2B are conceptual drawings illustrating double vision due to the misregistration of multiple eyepoints.
Figure 2B:
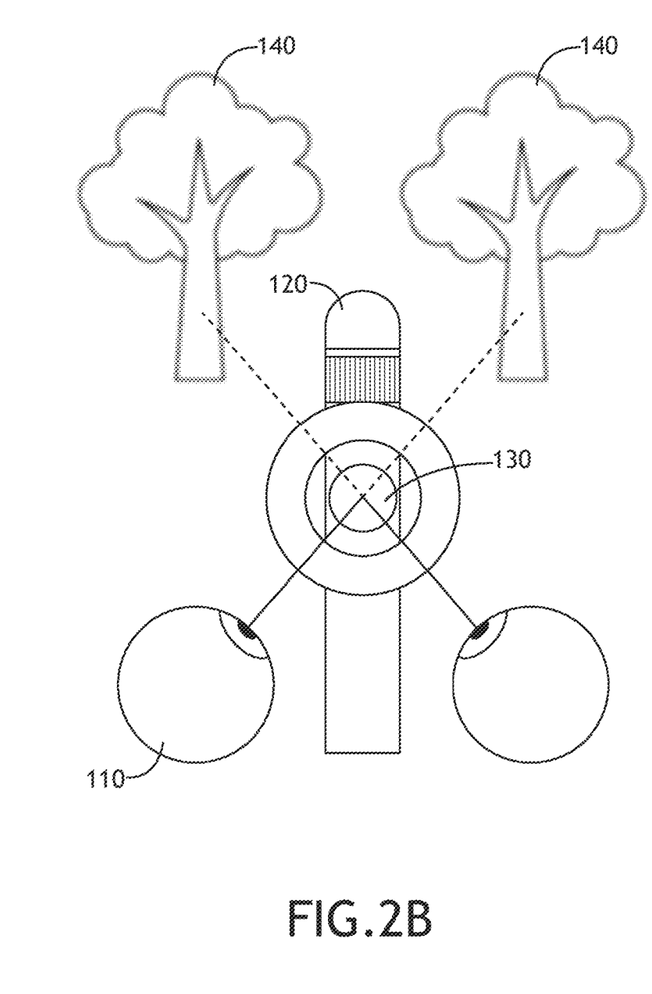

FIGS. 2A-2B are conceptual drawings further illustrating the problem of double vision due to the misregistration of multiple eyepoints 110. Double vision is comparable to the physiological phenomenon diplopia (an impairment of human vision). Focusing on a far-away object makes closer objects look double, while focusing on a closer object makes far-away objects look double.

In FIG. 2A, an object 140 at a first distance is in the focus of the eyepoints 110 (e.g., at the focus point 130), and an object 120 at a second distance is out of the focus and appears as two objects (even though it is physically a single object). In FIG. 2B, the object 120 at the second distance is in the focus of the eyepoints 110 (e.g., at the focus point 130), and the object 140 at the first distance 130a is out of focus and appears as two objects (even though it is physically a single object).

To dynamically register multiple sensor viewpoints at variable focal depths, embodiments of the present disclosure are directed to a size-weight-and-power (SWaP) efficient extension of existing distortion correction functions. In some embodiments, a misregistration function may be implemented as part of a look-up-table (LUT)-based distortion correction function such that multiple LUTs may be precomputed for multiple fixed focal depths. LUTs intended to correct the images at focal depths in between the fixed focal depths may be interpolated (i.e., estimated) on a pixel-by-pixel basis using the precalculated LUTs for the fixed focal depths. By adding as little as a single interpolation step per pixel, no other computation is required, and only a few precalculated LUTS may be required for a range of focal depths (e.g., from a focal depth directly in front of the sensors to a focal depth at an infinite distance away).

In some embodiments, when a relatively small amount of LUTs are precalculated (e.g., at two or three fixed depths), the interpolation may be linear. In some embodiments, when a relatively large amount of LUTs are precalculated (e.g., at more than three depths), the interpolation may be piecewise-linear (with one or more line-segments). In some embodiments, the interpolation may be bicubic. A given set of image sensors may be tested at various focal depths using both linearly interpolated LUTs, piecewise-linearly interpolated LUTs, bicubic interpolated LUTs, etc., and the technique that produces the highest quality image registration (i.e., without double vision or misregistration) may be implemented based on the experimentation.

Lag in the display (e.g., an HMD worn by a user) may cause disorientation and nausea in the user due to a delay between the user's head motion and corresponding movement in the display. To enable a fast rate of interpolation (which is especially critical in aircraft systems for safety reasons since clear vision is needed at all times), a fast-rate depth tracker (e.g., depth sensor or depth estimator) may be implemented with the sensors and the parallax/distortion correction LUTs. A detected or estimated focal depth may be used to dynamically (i.e., on-the-fly) interpolate between the appropriate parallax-correction LUTs (e.g., a first LUT at a first focal depth proximal to the user and a second LUT at a second focal depth distal to the user, where the detected focal depth is between the first LUT and the second LUT). In some embodiments, the depth tracker (e.g., depth estimator or depth sensor) may be an eye tracker that tracks a location in the 3-D environment around the user where the user's eyes are focused (i.e., the focus point of the user's eyes, or the user's gaze).

Figure 3:
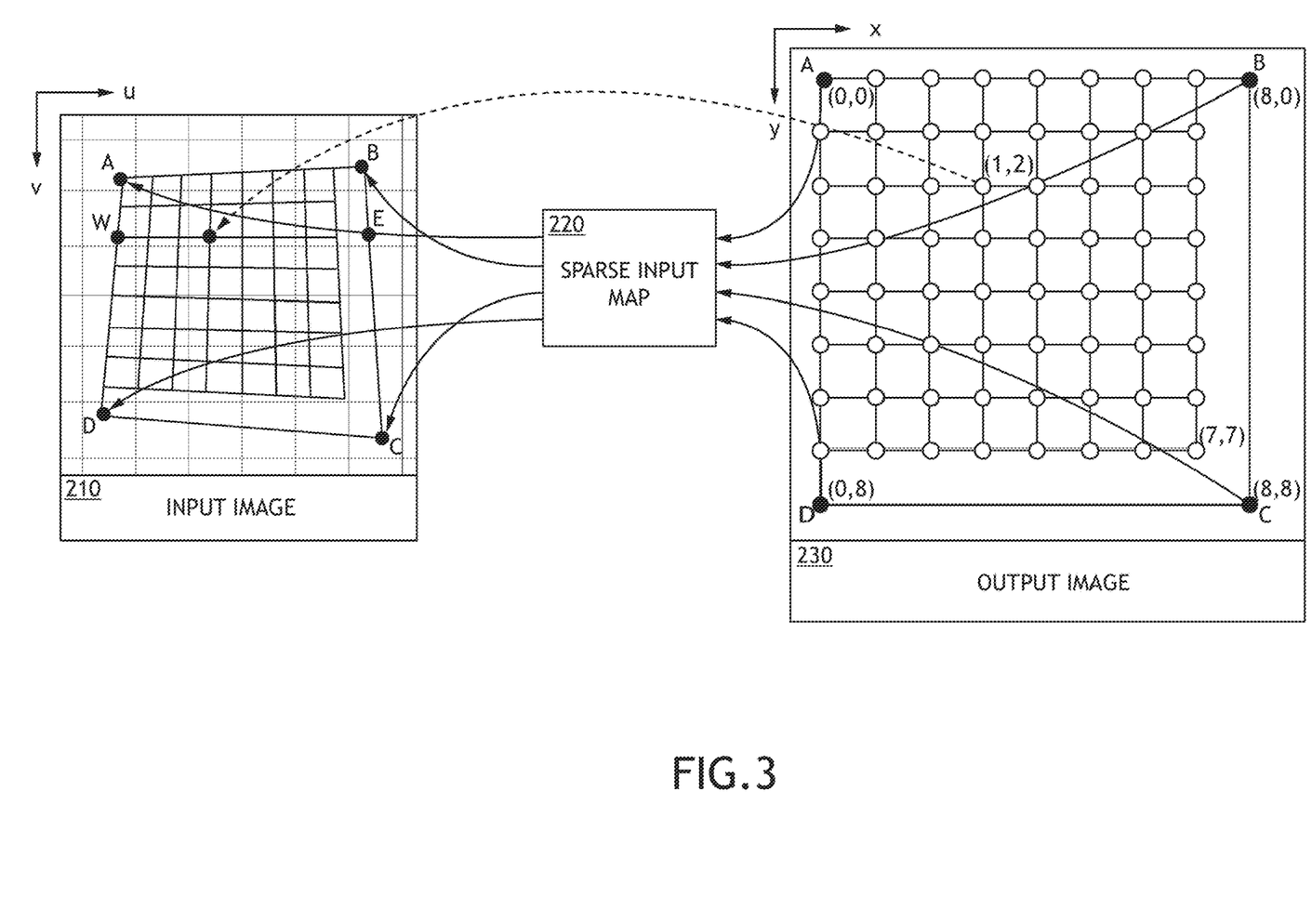
FIG. 3 is a diagram illustrating a linear map that corrects for distortion and parallax, in accordance with one or more embodiments of the present disclosure.

FIG. 3 is a diagram illustrating a sparse input map 220 (e.g., an algorithm that corrects for distortion and parallax using a LUT for a given focal depth), in accordance with one or more embodiments of the present disclosure. As shown, each pixel in the distorted input image(s) 210 is mapped (i.e., linearly transformed) to a corresponding pixel in the corrected output image 230. The linear transformation may adjust the location of each pixel such that the output image 230 appears natural to the human eye (without double vision due to parallax misregistration between conflicting images and without curves due to spherical lens distortion). In some embodiments, the LUT of the sparse input map 220 may be interpolated between a first precomputed LUT at a first focal depth and a second precomputed LUT at a second focal depth in front of aircraft sensors.

This interpolation may save scarce memory space on a SWaP-constrained computer vision system, since each LUT may require a significant amount of both nonvolatile and volatile memory to store. Even a relatively low resolution LUT (e.g., having few rows and columns) may be too large for static memories (block RAM/ROM) that may be paired with embedded processing hardware such as field-programmable gate arrays (FPGAs), graphics processing units (GPUs), and other SWaP-constrained devices. Thus, a conventional software approach (e.g., not constrained by memory or other hardware bottlenecks) that calculates LUTs on the fly using trigonometric and exponential math (in contrast to interpolating LUTs from precalculated ones using simple addition and multiplication, as disclosed by embodiments of the present disclosure) is not feasible for a hardware implementation on an SWaP-constrained computer vision system since it requires a significant amount of memory space and bandwidth.

Figure 4:
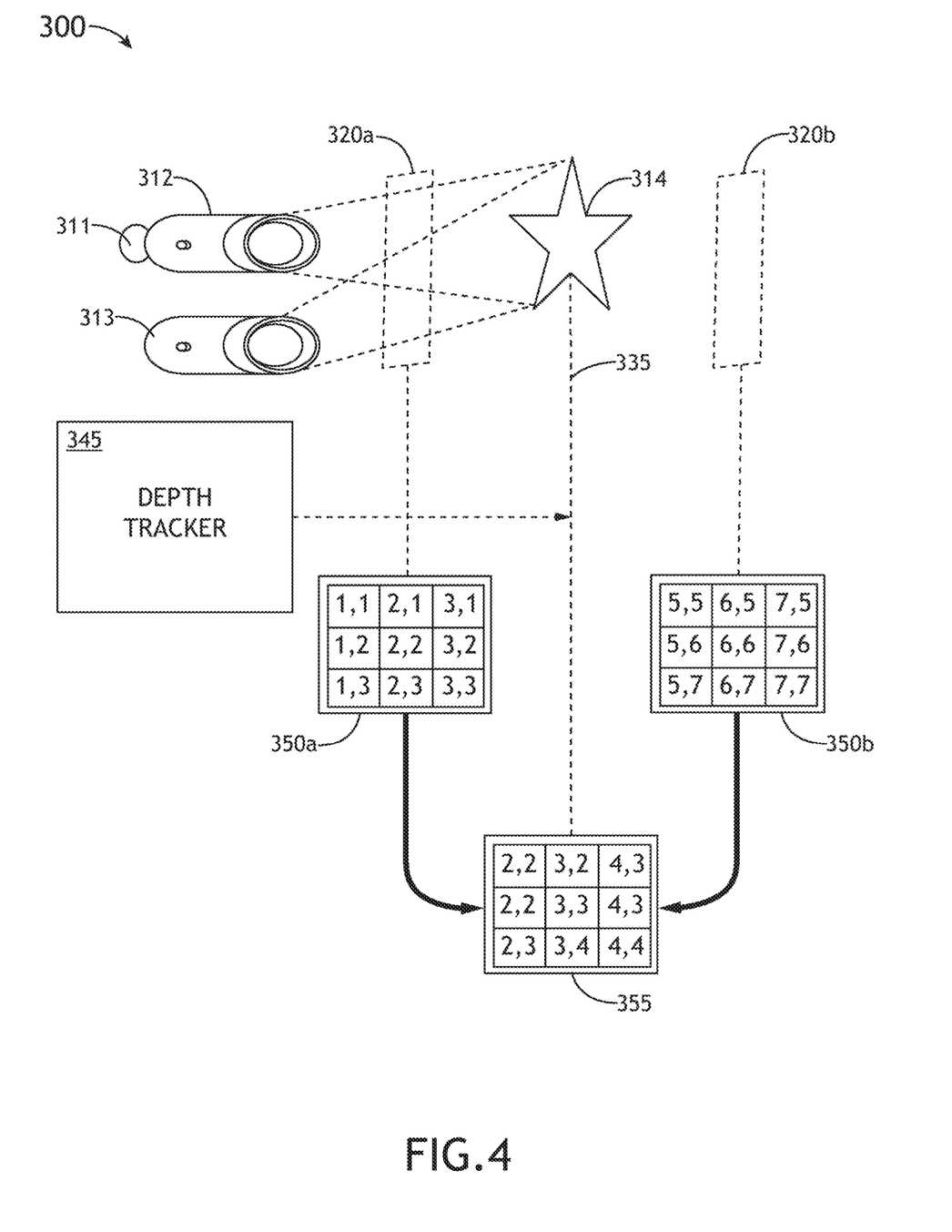
FIG. 4 is a diagram illustrating a vision system that dynamically corrects for distortion and parallax at varying depths of focus, in accordance with one or more embodiments of the present disclosure.

FIG. 4 is a diagram illustrating a vision system 300 that dynamically corrects for distortion and parallax at varying focal depths 320a and 320b. The system 300 may be, for example, a SWaP-constrained system powered by a battery and having strict size, weight and power limitations (e.g., a portable system). The system 300 may comprise, for example, a head-mounted display (goggles, glasses, visor, etc.) such as a headset for an AR or mixed reality system, or night vision goggles. In some embodiments, the system 300 may comprise an unmanned aerial vehicle (UAV), a drone, a satellite, a manned aerial vehicle (e.g., combat, surveillance, and/or transport aircraft, helicopters, etc.), a ground-based vehicle (bicycles, motorcycles, cars, trucks, trains, etc.), a water-based vehicle (boats, ships, hovercraft, etc.). Additionally, the system 300 may have applications in a variety of fields including military training and operations, civilian transportation, manufacturing, maintenance, simulation, and gaming, although the system 300 is not limited thereto.

The multispectral image sensors 312 and 313 may be configured to capture an image (i.e., a scene) that includes an object 314 in the surrounding environment. The multispectral image sensors 312 and 313 may comprise any combination of optical, IR, UV, X-ray, and/or other radiation sensors. The sensor 312 may be boresighted to the eyepoint 311, while the sensor 313 may not be boresighted such that it captures a different field of view of the scene. It is noted that the vision system 300 is not limited to only the two sensors 312 and 313, and may be implemented with additional sensors (for example, four, eight, etc.) that are not boresighted to the same eyepoint 311 (or even multiple eyepoints).

In one example, two image sensors 312 (e.g., RGB cameras) respectively boresighted to left and right eyepoints 311 of a user may be combined with a hyperspectral sensor 313 (e.g., a depth-tracking camera or an IR camera) that is not boresighted to either of the eyepoints 311. The RGB cameras 312 may be naturally aligned to the user's eyepoints and thus may not require parallax correction. However, since the depth-tracking or IR camera 313 is inherently misaligned (since the viewpoint of the camera 313 must be reprojected to both eyes), the parallax and distortion correction for the depth-tracking or IR camera 313 may be performed twice (once to the left eye and once to the right eye) such that each eye views a correctly aligned (e.g., without parallax misregistration or optical distortion).

In some embodiments, the sensors 312 and 313 are communicatively coupled to a controller (i.e., computing system; not shown) including one or more processors and a memory. The one or more processors may include one or more central processing unit (CPUs), graphics processing units (GPUs), application-specific integrated circuits (ASICs), and/or field-programmable gate arrays (FPGA). The memory may include nonvolatile memory (e.g., hard disk drive, SSD, flash memory, ROM, etc.) and volatile memory (RAM, SDRAM, etc.). The one or more processors may be configured to execute program instructions stored on the memory and cause the one or more processors to perform various functions, procedures, algorithms, etc. described in the present disclosure (for example, the sparse input map 210 may be stored on the memory and executed by the one or more processors).

A registration algorithm may be required to correct for parallax between the two conflicting images respectively captured by the sensors 312 and 313. Additionally, spherical lenses in the optical paths of the sensors 312 and 313 may introduce optical distortion into the captured images. To solve these issues, a combined distortion and parallax correction algorithm (e.g., substantially similar the sparse input map 220 as described previously) may be implemented with the vision system 300. The vision system 300 may be integrated easily with existing systems since many already include a distortion correction algorithm, and thus, the same algorithm may be modified to construct a combined distortion and parallax correction algorithm.

The first focal depth 320a may be at a first distance from the sensors 312 and 313 and the focal second depth 320b may be at a second distance from the sensors 312 and 313. The first focal depth 320a may be closer to the sensors 312 and 313 (i.e., proximal to the sensors) such that the second focal depth 320b is farther away from the sensors 312 and 313 (i.e., distal from the sensors) than the first focal depth 320a. A first LUT 350a for distortion and parallax correction (e.g., substantially similar to the sparse input map 220 of FIG. 3) may be precalculated to correct parallax and distortion in the images at the first focal depth 320a. Likewise, a second LUT 350b for distortion and parallax correction (e.g., substantially similar to the sparse input map 220 of FIG. 3) may be precalculated to correct parallax and distortion in the images at the second focal depth 320b.

As shown, the sensors 312 and 313 may be focused on the object 314 at a focal depth 335 that does not have a precalculated LUT for parallax and distortion correction. Calculating a LUT on-the-fly for the focal depth 335 using trigonometric functions (e.g., for parallax correction) and exponentiation functions (e.g., for a model of optical distortion at a given focal depth) is prohibitive since it is computationally intensive. The computational impact is especially high on SWaP-constrained embedded systems (e.g., head-worn displays, UAVs, etc.) at real-time video rates. Even if a LUT is precalculated for every focal depth in a range of from 0.1 to 100 m (e.g., at 1 cm increments), the system may still be constrained by memory capacity.

To solve the issues of limited computing power and memory capacity, an interpolated LUT 355 may calculated by interpolating or estimating on a pixel-by-pixel basis between the precalculated LUT 350a at the first focal depth 320a and the precalculated LUT 350b at the second focal depth 320b (e.g., using an interpolation ratio). The interpolation ratio may be, for example: (distance of depth 335–distance of depth 320a)÷(distance of depth 320b–distance of depth 320a).

Interpolation is significantly more computationally efficient since the interpolated LUT 355 may use only multiplication and addition (i.e., linear algebra) to estimate the transformation at every pixel instead of trigonometric functions and/or exponentiation functions (e.g., as may be used when calculating the precalculated LUTs 350a and 350b). By adding as little as a single interpolation step per pixel, no other computation is required, and relatively few precalculated LUTs may be required for a range of focal depths (e.g., from a focal depth directly in front of the sensors 312 and 313 to a focal depth at an infinite distance away). It is noted that the present disclosure is not limited to only two LUTs 350a-b and that a plurality of LUTs may be calculated for a plurality of focal depths.

In some embodiments, when a relatively small amount of LUTs are precalculated (e.g., at two or three fixed focal depths), the interpolation may be linear. In some embodiments, when a relatively large amount of LUTs are precalculated (e.g., at more than three focal depths), the interpolation may be piecewise-linear (with one or more linesegments). A given set of image sensors (e.g., image sensors 312 and 313) may be tested at various focal depths using both linearly interpolated LUTs and piecewise-linearly interpolated LUTs, and the technique that produces the highest quality image registration (i.e., with the least blur or misregistration) may be implemented based on the experimentation. In some embodiments, alternate interpolation functions (e.g., bicubic interpolation) may be used if linear interpolation produces inaccurate results for the given set of sensors.

In some embodiments, a fast-rate depth tracker 345 (e.g., depth sensor or depth estimator) may be implemented with the the parallax/distortion correction LUTs to enable a fast rate of interpolation (which is critical in aircraft systems for safety reasons since clear vision is needed at all times). A detected or estimated focal depth may be used to dynamically (i.e., on-the-fly) interpolate between the appropriate parallax-correction LUTs (e.g., a first LUT at a first depth proximal to the user and a second LUT at a second depth distal to the user, where the detected depth is between the first LUT and the second LUT).

Figure 5A:
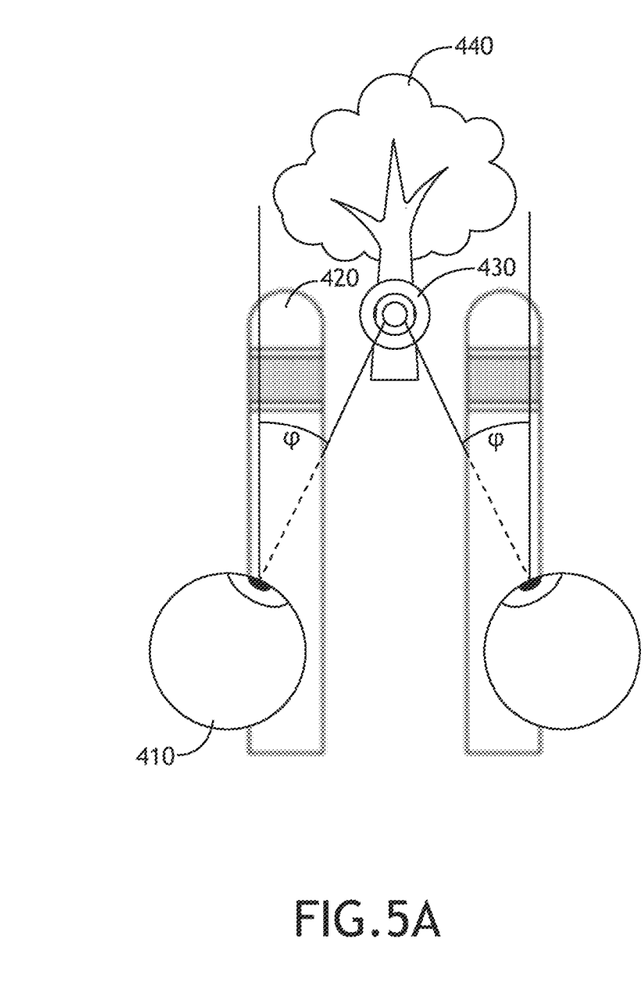
FIGS. 5A-5B are conceptual drawings illustrating depth tracking using an eye tracker, in accordance with one or more embodiments of the present disclosure.
Figure 5B:
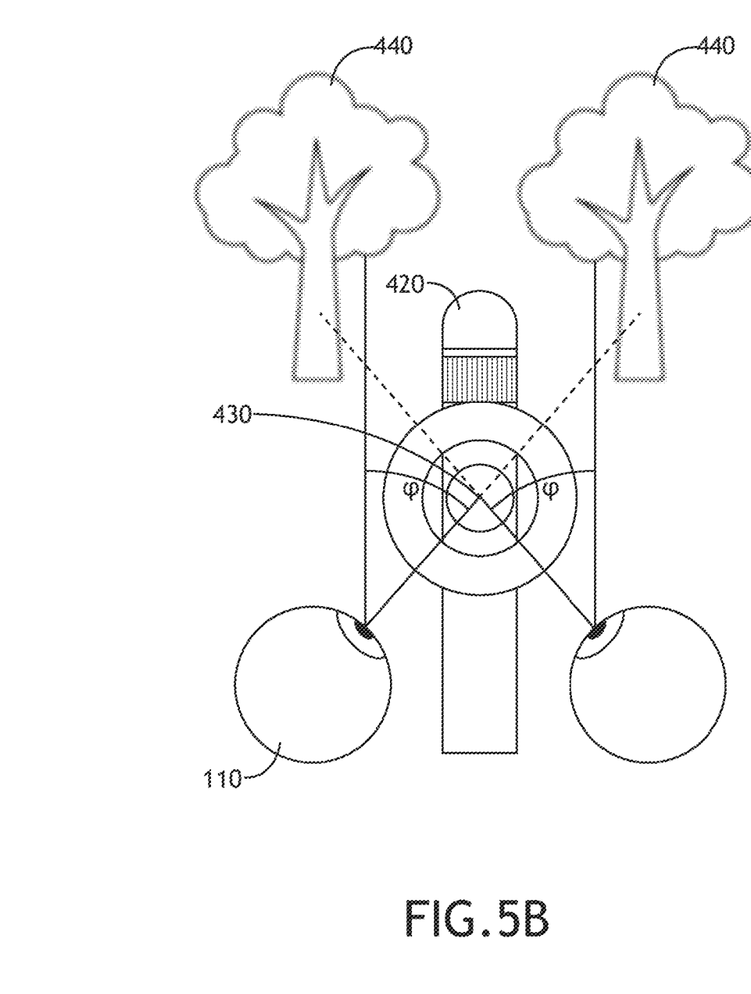

In some embodiments, the depth tracker 345 may be an eye tracker that tracks a location in the three-dimensional (3D) environment around the user where the user's eyes are focused (i.e., the focus point of the user's eyes, or the user's gaze). As shown in FIGS. 5A and 5B, the eye tracker may be configured to track the angles of vergence φ of a user's eyes 410. The convergence of two vectors of the user's gaze at the focus point 430 may be used to calculate (e.g., extract) the tracked or estimated focal depth (e.g., gaze point of a user at a distance in front of the sensors 312 and 313). As shown in FIG. 5A, when the eyes 410 are focused on the object 440 that is farther away, the angles of vergence φ are relatively narrow. In contrast, in FIG. 5B, when the eyes 410 are focused on the object 420 that is closer, the angles of vergence φ are relatively wide. In this way, the differences in the angles of vergence φ of each eye 410 may be used to directly measure the gaze point of the user (and the focal depth to be selected for the interpolated LUT 355).

In some embodiments, a user's gaze may be assumed to be at the center of the display, and objects in the optical path of the fixed gaze may have their focal depth measured or estimated by the depth tracker 345. For example, an IR beam may be projected in front of an aircraft toward the fixed gaze point, and the amount of time taken for the beam to return may be used to extract the measured or estimated depth to be used for the interpolated LUT 355. Caution may be taken when the using an IR beam depth tracker since, in military applications, the beam may, for example, reveal the location of a soldier wearing a digital night vision HMD to enemy combatants.

In some embodiments, the depth tracker 345 may be a time-of-flight sensor (ToF sensor) that employs time-of-flight techniques to resolve distance between the sensor and the fixed gaze point for each point in the captured image by measuring the round trip time of an artificial light signal provided by a laser or an LED. Compared to other 3D laser scanning methods for capturing 3D images, ToF sensors operate comparatively quickly by providing up to 160 operations per second.

Figure 6:
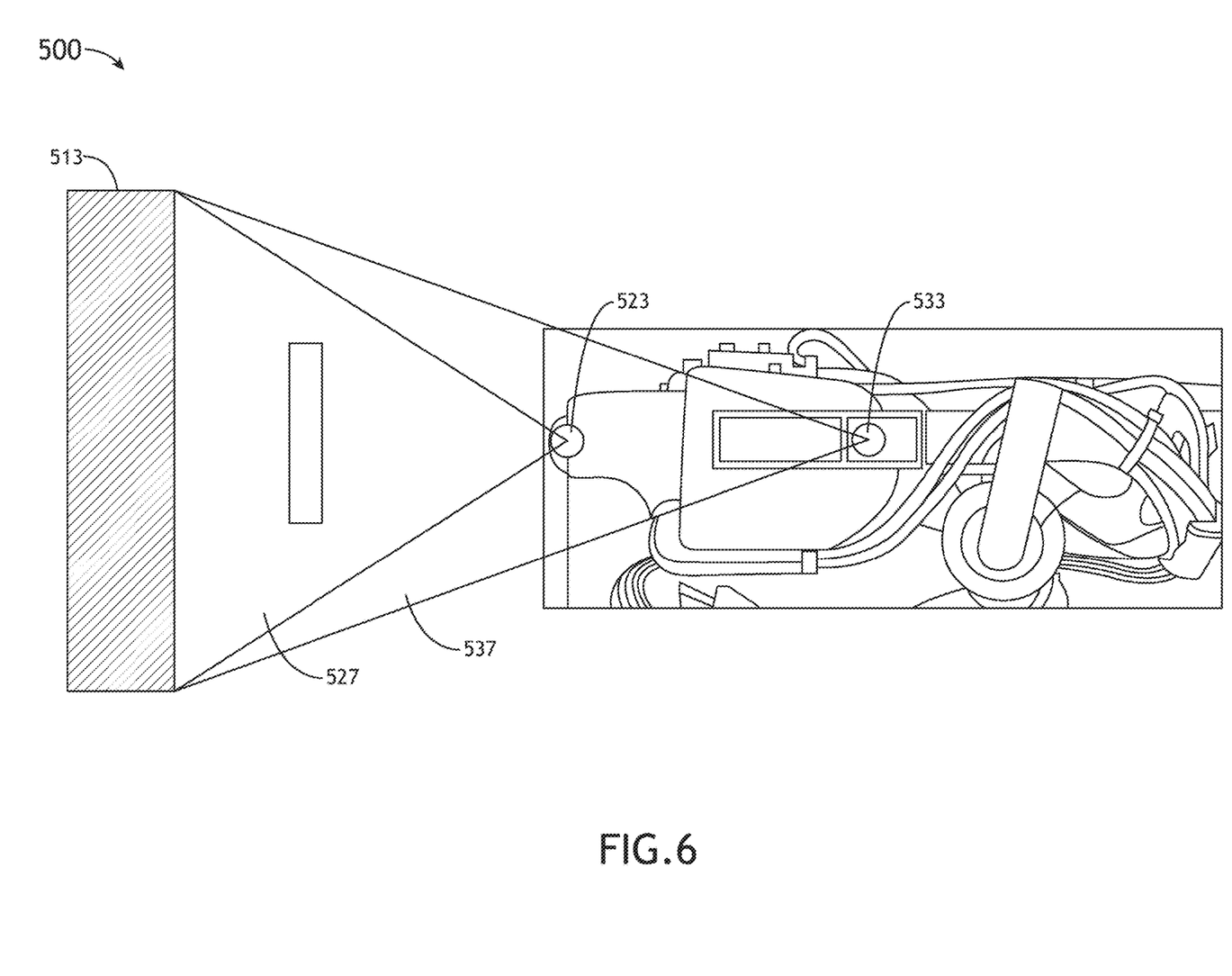
FIG. 6 is a side view of a camera having an eyepiece and a sensor, in accordance with one or more embodiments of the present disclosure.

FIG. 6 shows a vision system 500 that is substantially similar to the vision system 300 of FIG. 4. The vision system 500 may be, for example, a bincocular (e.g., stereo) head-mounted display (HMD), goggles, glasses, a camera, etc. However, in this embodiment, there may be only a single image sensor 523 configured to capture a scene 527 of an object 513, and an eyepiece 533 (i.e., display) configured to display a scene 537 of the object 513. In some embodiments, the eyepiece 533 and the sensor 523 may not optically aligned (i.e., not boresighted) and are offset from each other. In some embodiments, the eyepiece 533 and the sensor 523 may be optically aligned (i.e., boresighted), but still offset from each other. To calibrate (i.e., register) the scene 527 (e.g., image) captured by the sensor 523 with the scene 537 that is shown to the user through the eyepiece 533, techniques incorporating a depth tracker, precomputed LUTs, and dynamically interpolated LUTs (substantially similar to the techniques described with respect to FIG. 3) may be employed in the vision system 500.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An augmented reality (AR) vision system, comprising:
    a display configured to present a surrounding environment to eyes of a user of the AR vision system;
    a depth tracker configured to measure a focal depth of a focus point in the surrounding environment, wherein the eyes of the user are focused on the focus point;
    two or more image sensors,
        wherein each respective one of the image sensors is configured to receive illumination from the focus point and generate a respective image of a plurality of images,
        wherein at least one of the image sensors is not optically aligned with at least one other of the two or more image sensors,
        wherein at least one of the images has a parallax error with at least one other of the images,
        wherein each of the images has a distortion error caused by lenses; and
    a controller communicatively couplable to the two or more image sensors including one or more processors configured to execute program instructions, wherein the program instructions cause the one or more processors to:
generate an interpolated look-up-table (LUT) for the measured focal depth by interpolating pixel-by-pixel between a first precalculated LUT and a second precalculated LUT using an interpolation ratio,
wherein the first precalculated LUT is configured to correct the parallax error and the distortion error at a first depth that is nearer to the user than the measured focal depth of the focus point,
wherein the second precalculated LUT is configured to correct the parallax error and the distortion error at a second depth that is further from the user than the measured focal depth of the focus point,
wherein the measured focal depth of the focus point is between the first depth and the second depth,
apply the interpolated LUT for the measured focal depth to the images to correct the parallax error and the distortion error at the measured focal depth and generate a single image of the surrounding environment, and
display the single image on the display to the user of the AR vision system.

2. The vision system of claim 1, wherein interpolating comprises linear interpolation.

3. The vision system of claim 1, wherein interpolating comprises piecewise-linear interpolation.

4. The vision system of claim 1, wherein interpolating comprises bicubic interpolation.

5. The vision system of claim 1, wherein the image sensors comprise at least one of an infrared sensor, an optical sensor, or a UV sensor.

6. The vision system of claim 1, wherein the depth tracker is an eye tracker.

7. The vision system of claim 6, wherein the eye tracker is configured to track the angles of vergence of the eyes of the user.

8. The vision system of claim 7, wherein the measured focal depth of the focus point is calculated from the angles of vergence.

9. The vision system of claim 1, wherein applying the interpolated LUT function comprises mapping or linearly transforming each pixel of the images to a corresponding pixel in the single image.

10. The vision system of claim 9, wherein mapping or linearly transforming comprises addition or multiplication.

11. The vision system of claim 1, wherein the precalculated LUTs are calculated using trigonometric functions and exponential functions, and the interpolated LUT function is not calculated using trigonometric functions and exponential functions.

12. The vision system of claim 1, wherein the depth tracker is a time-of-flight sensor (ToF sensor).

13. The vision system of claim 1, wherein the focus point is at a center of the display or an infinity focus.

14. The vision system of claim 13, wherein the depth tracker is an IR depth tracker configured to project a beam at the center of the display.

15. The vision system of claim 1, wherein the interpolation ratio is defined by:

$$\frac{\text{(the measured focal depth of the focus point} - \text{the first depth)}}{\text{(the second depth} - \text{the first depth)}}.$$

* * * * *